US 8,868,068 B2

(12) United States Patent
Mishkin (10) Patent No.: US 8,868,068 B2
(45) Date of Patent: *Oct. 21, 2014

(54) DETERMINING TELECOMMUNICATION SUBSCRIBER METRICS

(71) Applicant: AT&T Mobility II LLC, Atlanta, GA (US)

(72) Inventor: Gregory Evan Mishkin, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,715

(22) Filed: Apr. 30, 2014

(65) Prior Publication Data

US 2014/0235196 A1    Aug. 21, 2014

Related U.S. Application Data

(63) Continuation of application No. 12/423,371, filed on Apr. 14, 2009, now Pat. No. 8,725,108.

(51) Int. Cl.
*H04W 40/00* (2009.01)
*H04M 15/00* (2006.01)
*H04W 4/24* (2009.01)

(52) U.S. Cl.
CPC .............. *H04M 15/60* (2013.01); *H04W 4/24* (2013.01)
USPC ......................................... 455/428; 455/445

(58) Field of Classification Search
CPC ..................................................... H04W 4/24
USPC ....................................................... 455/428
See application file for complete search history.

(56) References Cited

U.S. PATENT DOCUMENTS

| 6,196,129 | B1 | 3/2001 | Kellett |
| 6,516,189 | B1 | 2/2003 | Frangione et al. |
| 6,745,001 | B2 | 6/2004 | Wright et al. |
| 6,751,295 | B2 | 6/2004 | McCulley et al. |

(Continued)

FOREIGN PATENT DOCUMENTS

WO    WO 2010/120602    10/2010

OTHER PUBLICATIONS

International Patent Application No. PCT/US2010/030162: International Search Report dated Apr. 8, 2011, 2 pages.

(Continued)

*Primary Examiner* — Huy C Ho
(74) *Attorney, Agent, or Firm* — Baker & Hostetler LLP (57) ABSTRACT

Information associated with a communication is gathered at a switching point during the routing process to determine subscriber metric information associated with an active service identifier. The information relates to the originator of the communication and the target. The information is compared to a provider database to determine a carrier originally associated with the active service identifier. The information is then compared to a porting database to determine if the active service identifier was ported, and if so, to which carrier the active service identifier was ported. A determination can then be made regarding which carrier is associated with the active service identifier. The data may be aggregated for a large amount of switched communications, representing a large amount of active service identifiers for a given market. Thus, a number of subscribers for a given carrier in a given market may be determined.

20 Claims, 7 Drawing Sheets

(56) References Cited

U.S. PATENT DOCUMENTS

| | | |
|---|---|---|
| 6,754,470 B2 | 6/2004 | Hendrickson et al. |
| 6,788,926 B1 | 9/2004 | Frangione et al. |
| 6,807,515 B2 | 10/2004 | Vogel et al. |
| 6,928,280 B1 | 8/2005 | Xanthos et al. |
| 7,013,136 B2 | 3/2006 | Frangione et al. |
| 7,319,847 B2 | 1/2008 | Xanthos et al. |
| 7,505,765 B2 | 3/2009 | Frangione et al. |
| 8,369,265 B2 * | 2/2013 | Vendrow et al. ............. 370/328 |
| 2003/0229534 A1 | 12/2003 | Frangione et al. |
| 2005/0032518 A1 * | 2/2005 | Rajan ........................ 455/435.1 |
| 2005/0197105 A1 | 9/2005 | McCann |
| 2005/0215250 A1 * | 9/2005 | Chava et al. .................. 455/433 |
| 2006/0270401 A1 | 11/2006 | Frangione et al. |
| 2007/0099609 A1 | 5/2007 | Cai |
| 2008/0221968 A1 | 9/2008 | Gaffney et al. |
| 2008/0248795 A1 | 10/2008 | Peterson et al. |
| 2008/0299910 A1 | 12/2008 | Peterson et al. |
| 2009/0005002 A1 | 1/2009 | Agarwal et al. |

OTHER PUBLICATIONS

Poole, "Estimating the Size of the Telephone Universe: A Bayesian Mark-Recapture Approach," KDD'04, Aug. 22-25, 2004, Seattle, Washington, USA, 659-664.

* cited by examiner

DETERMINING TELECOMMUNICATION SUBSCRIBER METRICS

CROSS REFERENCE TO RELATED APPLICATIONS

This application is a continuation of, and claims priority to, U.S. patent application Ser. No. 12/423,371, filed Apr. 14, 2009, entitled "Determining Telecommunication Subscriber Metrics," the entire contents of which are hereby incorporated herein by reference.

BACKGROUND

Communications services have become an important part of modern life (e.g., phone service, internet service, text messaging service, paging service, GPS service, music service, gaming service, and the like), as have the devices associated with the communications (e.g., telephones, including cellular telephones, computers, notebook computers, personal digital assistants, music players, gaming systems and the like). As one example, cellular telephone usage has proliferated rapidly over the past decade. By some estimates, cellular telephone usage in the United States alone has grown from 34 million users in 1995 to over 200 million in 2005.

The term subscriber may refer to an end user of a communication service, e.g., an end-user of phone service, internet service, text messaging service, paging service, GPS service, music service, gaming service, or the like. A subscriber of mobile telephone communication service may be referred to as a mobile subscriber. For example, a mobile subscriber may be associated with a phone number that the mobile subscriber uses with a mobile communications device, such as a cellular telephone.

The terms cellular telephone and mobile telephone may be used interchangeably herein. Further, the term phone call may refer to any type of phone call (e.g. a call from/to a cellular telephone, a call from/to a land line telephone, etc.).

The term carrier may refer to an entity that provides communication services to subscribers. For example, a carrier may route calls to or from a subscriber using networks owned or operated by the carrier and/or other networks.

Mobile subscribers may enter into an agreement for services with a carrier in order to be able to use associated cellular telephones. Further, carriers may compete to attract mobile subscribers.

Subscriber metrics describe characteristics of subscribers, especially as they relate to carriers. For example, subscriber metrics may estimate carrier market share (e.g., the number of subscribers associated with a given carrier in a market as a percentage of the total number of subscribers in the market), the number of subscribers associated with a carrier in a market, carrier churn rate, carrier activation rate (or number of activations for a carrier in a given period), carrier deactivation rate (or number of deactivations for a carrier in a given period), and the like.

By analyzing subscriber metrics, carriers may be better able to utilize marketing resources. This may include being able to determine needs or preferences of subscribers and offering products or services that appeal to those needs or preferences.

Changes in subscriber metrics may happen over short periods of time. Carriers may find it beneficial to be apprised of subscriber metrics often and with little lag time. For example, if carriers are timely informed of changes in the needs or preferences of subscribers, carriers may be able to reallocate resources in response to changing subscriber needs or preferences.

Current methods of gathering and analyzing subscriber data to determine subscriber metrics have many problems. For example, consider the following examples illustrating problems with current methods of determining mobile subscriber metrics, which may also have applicability to other communications services.

Subscriber metric data for public carriers may be available quarterly, but with a significant lag time. Carriers may desire timelier subscriber metrics, subscriber metrics for different periods of time, subscriber metrics for shorter time periods, subscriber metrics with less lag time, etc. For example, carriers may desire subscriber metrics over shorter periods of time because mobile subscriber trends may take place in a much shorter period than three months. Another example is that a carrier may want timely information before starting a marketing campaign.

Currently, subscriber metric data may only be available for certain geographic regions. That is, subscriber metric data may be unavailable for regions in which a carrier may be interested, such as data on a particular county, city, sales market, etc.

Currently, another method to determine subscriber metrics is available. The other method uses sampling and/or querying to determine subscriber metrics (the "sampling/querying method"). The sampling/querying method also has many shortcomings The sampling/querying method begins by selecting a subset of numbers owned by a carrier and monitoring those numbers (i.e., a sample is selected from the possible universe of numbers associated with a carrier). The sample selection may be made from the Local Exchange Routing Guide (LERG), which may identify numbers assigned to a carrier.

A problem with this step is that only a small subset of actual numbers is used. Using a subset of numbers as an estimate for total numbers introduces error into the resulting subscriber metrics because the resulting estimates are not based on actual data. Further, as the size of the sampled subset of numbers decreases, the error introduced into the resulting subscriber metrics may increase. Typically, the sampling/querying method uses less than 5% of actively assigned numbers.

Another problem with the sampling/querying method is that the sample set may include a variable amount of inactive numbers (i.e., a number not currently assigned to a subscriber). For example, the LERG data simply states which numbers may be assigned to a carrier. However, just because a number was assigned to a carrier does not mean that the number is an active number. By analyzing inactive numbers, resources are wasted.

Another problem with the sampling/querying method is the use of SS7 queries to confirm subscriber information. The sampling/querying method uses SS7 queries to determine information about a number. That is, under the current method an SS7 query is sent out to a device associated with the number for which the SS7 query was sent. The SS7 query typically gets information about the number from an HLR.

Using SS7 queries to determine subscriber metrics is a waste of resources. For example, by using an SS7 query one or more additional steps are needed in addition to the methods herein described. In addition an SS7 query adds an additional and unnecessary burden on communications networks because SS7 queries are routed through communications networks.

Using SS7 queries to determine subscriber metrics introduces additional inaccuracies into the subscriber metrics determined by the sampling/querying method. For example, SS7 queries determine mobile subscriber information from data associated with HLR's. However, carriers do not keep data at the HLR level up to date. Because information at HLR's may be inaccurate, using SS7 queries introduces additional inaccuracies into the subscriber metrics determined by the sampling/querying method.

Another problem with the sampling/querying method is that significant research and development must be performed before the method can be used in a new geographic region. For example, SS7 querying for a geographic region may only be meaningful if research is performed relating to the geographic region.

Thus, there exists a need to improve upon current methods of providing subscriber metrics.

SUMMARY

The disclosed embodiments provide systems and methods for determining subscriber metrics based on information gathered at switching points of a communications network.

A communication, such as a phone call for example, may be routed through a network. As part of the routing, the communication may be switched at a switching point. A record of the communication, such as a call detail record associated with a phone call, may be created at the switching point in the network. The record may comprise information fields relating to the communication, including information fields that identify an active service identifier(s) associated with the communication. For example, for a phone call, a call detail record may comprise active service identifiers, such as an originating phone number and/or a target phone number.

Information in the record may be compared to one or more databases to determine which carrier is associated with an identified active service identifier. For example, still using a phone call example, a phone number (e.g., the originating phone number and/or target phone number) may be compared to a service provider number database (e.g., a database that identifies the carrier that was originally assigned to the number). An example of such a database is the Local Exchange Routing Guide (LERG). Thus, the carrier originally assigned to the phone number is determined.

The phone number may also be compared to a porting database (e.g., a database that identifies numbers that have been ported and the carrier information relating to the porting). An example of a porting database is the Local Number Portability (LNP) database. By comparing the phone number to the LNP, a determination of the carrier associated with the number may be performed. That is, the phone number may be associated with the carrier originally assigned to the phone number, unless the porting database indicates another carrier.

The carrier data may be aggregated to provide subscriber metrics. For example, as described above, a carrier may be associated with an active service identifier by using information from a switched communication. When switching a large number of communications, a large number of active service identifiers may be identified (e.g., a carrier may switch a large amount of communications in a particular market). Further, each of the identified active service identifiers may have an associated carrier. By aggregating the active service identifiers associated with a given carrier in a market, the number of subscribers for that carrier may be calculated (i.e., a number of subscribers for the given carrier in a particular market may be determined). In addition, by comparing the amount of subscribers associated with the given carrier in a market with the total number of subscribers in the market, a market share for the given carrier may be determined.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

DETAILED DESCRIPTION OF ILLUSTRATIVE EMBODIMENTS

The detailed description that follows may refer to steps (i.e., portions of a method). However, the disclosed steps and associated methods are exemplary. The order of the steps may be varied where appropriate. In addition, steps may be omitted if not needed and additional steps may be added where appropriate.

The present disclosure describes with particular reference and application to mobile communications services, and in particular to mobile subscribers; however, the claimed embodiments are not intended to be limited to mobile communications services or mobile subscribers. The claimed embodiments are equally applicable to any service capable of performing as herein described. For example, subscriber metrics may be determined as herein described for other services routed through a network (e.g., internet service, text messaging service, paging service, GPS service, music service, gaming service, and the like).

Figure 1A:
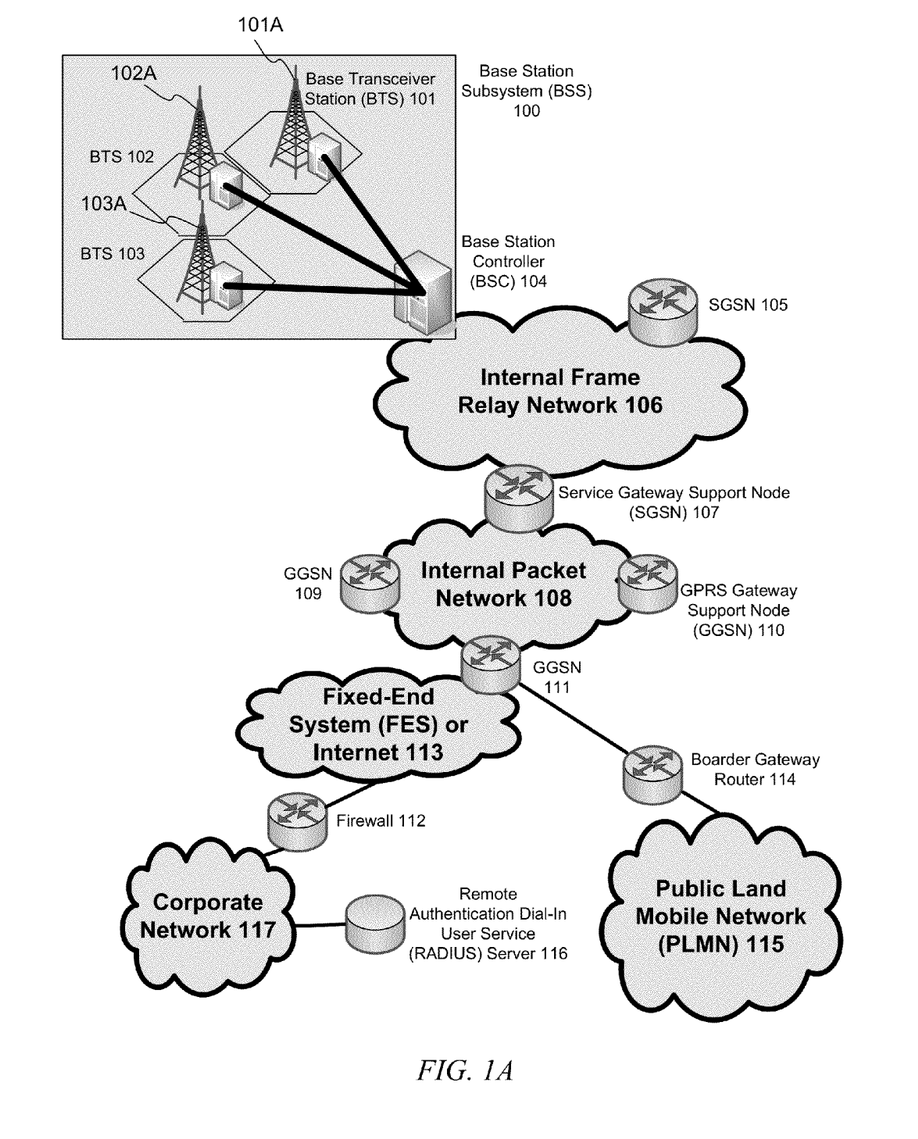
FIG. 1A illustrates an overview of an exemplary network environment in which aspects of one or more embodiments may be implemented.
Figure 1B:
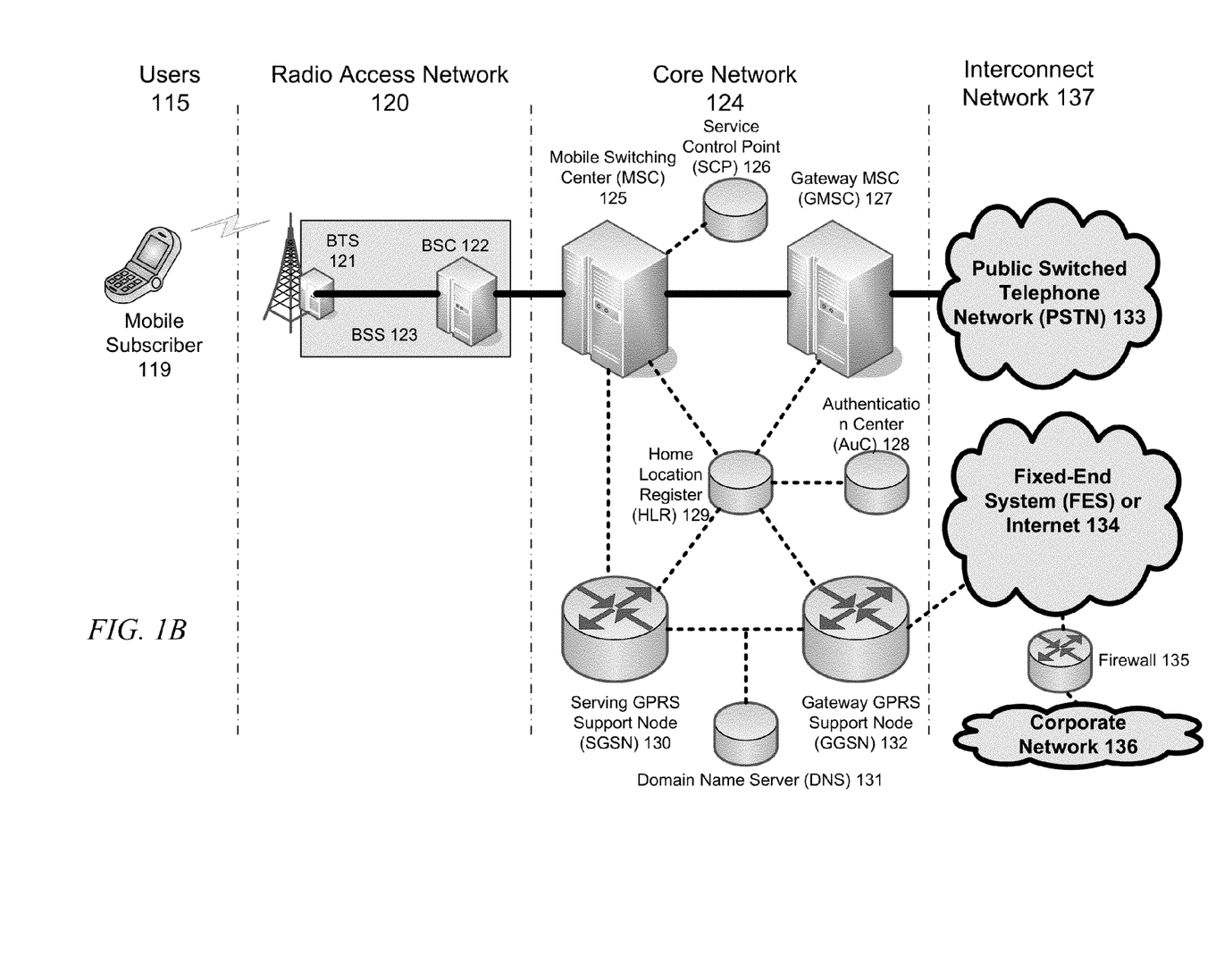
FIG. 1B illustrates an exemplary GPRS network architecture in which aspects of one or more embodiments may be implemented.
Figure 2:
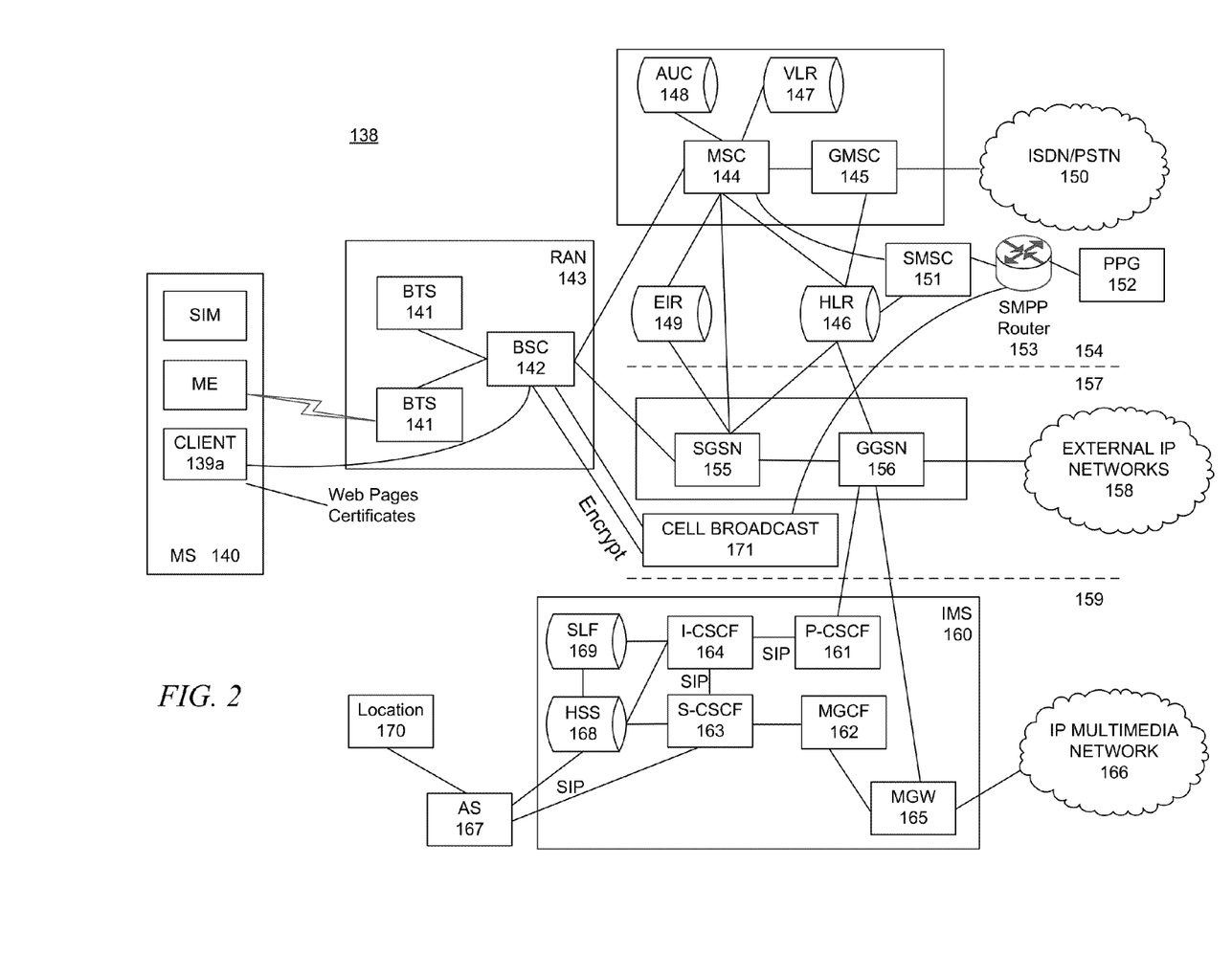
FIG. 2 illustrates an alternate block diagram of an exemplary GSM/GPRS/IP multimedia network architecture in which aspects of one or more embodiments may be implemented.

FIGS. 1A, 1B and 2 depict some example telephony radio networks and non-limiting operating environments in which a call enhancement with localized information system may be implemented. The below-described operating environments should be considered non-exhaustive, however, and thus the below-described network architecture merely shows an example network architecture in which aspects of various embodiments may be incorporated. One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 1A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 100 (only one is shown in FIG. 1A), each of which comprises a Base Station Controller ("BSC") 104 serving a plurality of Base Transceiver Stations ("BTS") such as, for example, the BTSs 101, 102 and 103. BTSs 101, 102 and 103 may include antennas 101A, 102A and 103A respectively. BTS's may be the access points where users of packet-based mobile devices become connected to the wireless network. In an embodiment, the packet traffic originating from user devices (e.g., cellular phones) is transported via an over the air interface to the BTS 103, and from the BTS 103 to the BSC 104. Base station subsystems, such as the BSS 100, may be a part of internal frame relay network 106 that may include Service GPRS Support Nodes ("SGSN") such as the SGSN 105 and 107. Each SGSN 105, 107, etc. may be in turn connected to an internal packet network 108 through which the SGSN 105, 107, etc. can route data packets to and from a plurality of gateway GPRS support nodes (GGSN) 111, 110, etc.

As illustrated, the SGSN 107 and the GGSNs 111 and 110 may be part of the internal packet network 108. Gateway GPRS serving nodes 111 and 110 may provide an interface to external Internet Protocol ("IP") networks such as Public Land Mobile Network ("PLMN") 115, corporate intranets 117, a Fixed-End System ("FES") and/or the public Internet 113 and/or the like. As illustrated, subscriber corporate network 117 may be connected to the GGSN 111 via a firewall 112; and the PLMN 115 may be connected to the GGSN 111 via a boarder gateway router 114. A Remote Authentication Dial-In User Service ("RADIUS") server 116 may be used for caller authentication when a user of a mobile cellular device calls corporate network 117, for example.

Generally, there may be four cell sizes in a GSM network—macro, micro, pico and umbrella cells. The coverage area of each cell is different in different environments. Macro cells may be regarded as cells where the base station antenna is installed in a mast or a building above average roof top level. Micro cells may be cells whose antenna height is under average roof top level; they are typically used in urban areas. Pico cells may be small cells having a diameter is a few dozen meters; they may be mainly used indoors. On the other hand, umbrella cells may be used to cover shadowed regions of smaller cells and fill in gaps in coverage between those cells.

FIG. 1B illustrates the architecture of a typical GPRS network as segmented into four areas: users 115, radio access network 120, core network 124 and interconnect network 137. The users' area 115 may include a plurality of end users. The radio access network 120 may include a plurality of base station subsystems such as the BSSs 123, which include BTSs 121 and BSCs 122. The core network 124 may include a host of various network elements. As illustrated here, the core network 124 may include a Mobile Switching Center ("MSC") 125, a Service Control Point ("SCP") 126, a gateway MSC 127, a SGSN 130, a Home Location Register ("HLR") 129, an Authentication Center ("AuC") 128, a Domain Name Server ("DNS") 131 and a GGSN 132. The interconnect network 137 also may include networks and network elements. As illustrated in FIG. 1B, the interconnect network 137 may include a Public Switched Telephone Network ("PSTN") 133, a Fixed-End System ("FES") and/or the Internet 134, a firewall 135 and/or a Corporate Network 136.

A mobile switching center 125 may be connected to a large number of base station controllers. At MSC 125, for example, depending on the type of traffic, the traffic may be separated such that voice may be sent to Public Switched Telephone Network ("PSTN") 133 through Gateway MSC ("GMSC") 127, and/or data may be sent to the SGSN 130, which then sends the data traffic to the GGSN 132 for further forwarding.

When the MSC 125 receives call traffic, for example, from the BSC 122, it may send a query to a database hosted by the SCP 126. The SCP 126 may process the request and may issue a response to the MSC 125 so that it may continue call processing as appropriate.

The HLR 129 may be a centralized database for users to register with the GPRS network. The HLR 129 may store static information about the subscribers such as the International Mobile Subscriber Identity ("IMSI"), subscribed services, and/or a key for authenticating the subscriber. The HLR 129 may also store dynamic subscriber information such as the current location of the mobile subscriber. Associated with HLR 129 may be an AuC 128. The AuC 128 may be a database that contains the algorithms for authenticating subscribers and may include the associated keys for encryption to safeguard the user input for authentication.

Any of the components described in relation to FIG. 1A may comprise a processor. A processor may include any hardware and/or software necessary for operating and/or controlling the component and/or components. A processor may have its own memory such as random access memory (RAM), register memory, cache memory, and the like. A processor associated with a component may be in communication with one or more of the other components described in relation to FIG. 1A.

A processor may operate on computer-executable instructions. Computer-executable instructions may include computer-readable instructions, for example machine code, byte code, script language, runtime code, and the like. The computer-executable instructions, when executed by the processor, may for example cause the processor to perform one or more parts of the functions and methods herein described.

In the following, depending on context, the term "mobile subscriber" may refer to either the end user or to the actual portable device used by an end user of the mobile cellular service. When a mobile subscriber turns on a mobile device, the mobile device goes through an attach process by which the mobile device attaches to a SGSN of the GPRS network. Referring now to FIG. 1B, mobile subscriber 119 may initiate the attach process by turning on the network capabilities of the mobile device. An attach request may be sent by the mobile subscriber 119 to the SGSN 130. The SGSN 130 may query another SGSN, to which the mobile subscriber 119 may have been attached before, for the identity of the mobile subscriber 119. Upon receiving the identity of the mobile subscriber 119 from the other SGSN, the SGSN 130 may request more information from the mobile subscriber 119. This information may be used to authenticate the mobile subscriber 119 to the SGSN 130 by the HLR 129. Once the mobile subscriber 119 is verified, the SGSN 130 may send a location update to the HLR 129 indicating the change of location to a new SGSN, in this case the SGSN at 130. The HLR 129 may notify the old SGSN, to which the mobile subscriber 119 was attached, to cancel the location process for the mobile subscriber 119. The HLR 129 may then notify the SGSN 130 that the location update has been performed. At this time, the SGSN 130 may send an "Attach Accept" message to the mobile subscriber 119, which in turn, may send an "Attach Complete" message to the SGSN 130.

After the attaching process, the mobile subscriber 119 may enter an authentication process. In the authentication process, the SGSN 130 may send authentication information to the HLR 129, which may send information back to the SGSN 130 based on the user profile that was part of the user's initial setup. The SGSN 130 may then send a request for authentication and ciphering to the mobile subscriber 119. The mobile subscriber 119 may use an algorithm to send the user identification (ID) and/or a password to the SGSN 130. The SGSN 130 may use the same algorithm to compare the result. If a match occurs, the SGSN 130 may authenticate the mobile subscriber 119.

Next, the mobile subscriber 119 may establish a user session with the destination network, for example, the corporate network 136, by going through a Packet Data Protocol ("PDP") activation process. The mobile subscriber 119 may request access to the Access Point Name ("APN"), for example, UPS.com, and the SGSN 130 may receive the activation request from the mobile subscriber 119. The SGSN 130 may then initiate a Domain Name Service ("DNS") query to learn which GGSN node has access to the UPS.com APN. The DNS query may be sent to the DNS server 131 within the core network 124 which may be provisioned to map to one or more GGSN nodes in the core network 124. Based on the APN, the mapped GGSN 132 may access the requested corporate network 136. The SGSN 130 may then send to the GGSN 132 a Create Packet Data Protocol ("PDP") Context Request message. The GGSN 132 may send a Create PDP Context Response message to the SGSN 130, which may then send an Activate PDP Context Accept message to the mobile subscriber 119.

Once activated, data packets of the call made by the mobile subscriber 119 may then go through radio access network 120, core network 124, and interconnect network 137, to reach corporate network 136.

Any of the components described in relation to FIG. 1B may comprise a processor. A processor may include any hardware and/or software necessary for operating and/or controlling the component and/or components. A processor may have its own memory such as random access memory (RAM), register memory, cache memory, and the like. A processor associated with a component may be in communication with one or more of the other components described in relation to FIG. 1B.

A processor may operate on computer-executable instructions. Computer-executable instructions may include computer-readable instructions, for example machine code, byte code, script language, runtime code, and the like. The computer-executable instructions, when executed by the processor, may for example cause the processor to perform one or more parts of the functions and methods herein described.

FIG. 2 shows an example block diagram view of a GSM/GPRS/IP multimedia network architecture 138. As illustrated, the architecture 138 of FIG. 2 includes a GSM core network 154, a GPRS network 157 and/or an IP multimedia network 159. The GSM core network 154 may include a Mobile Station (MS) 140, at least one Base Transceiver Station (BTS) 141, and/or a Base Station Controller (BSC) 142. The MS 140 may be Mobile Equipment (ME), such as a mobile phone and/or a laptop computer that is used by mobile subscribers, with a Subscriber identity Module (SIM). The SIM may include an International Mobile Subscriber Identity (IMSI), which may include a unique identifier of a subscriber. The BTS 141 may be physical equipment, such as a radio tower, that enables a radio interface to communicate with the MS 140. Each BTS may serve more than one MS 140. The BSC 142 may manage radio resources, including the BTS 141. The BSC 142 may be connected to several BTS 141. The BSC 142 and BTS 141 components, in combination, are generally referred to as a base station (BS) and/or a radio access network (RAN) 143.

The GSM core network 154 may include a Mobile Switching Center (MSC) 144, a Gateway Mobile Switching Center (GMSC) 145, a Home Location Register (HLR) 146, a Visitor Location Register (VLR) 147, an Authentication Center (AuC) 148, and an Equipment Identity Register (EIR) 149. The MSC 144 may perform a switching function for the network. The MSC may perform other functions, such as registration, authentication, location updating, handovers, and call routing. The GMSC 145 may provide a gateway between the GSM network and other networks, such as an Integrated Services Digital Network (ISDN) or a Public Switched Telephone Network (PSTN) 150. In other words, the GMSC 145 may provide interworking functionality with external networks.

The HLR 146 may include a database that contains administrative information regarding each subscriber registered in a corresponding GSM network. The HLR 146 may contain the current location of each mobile subscriber. The VLR 147 may include a database that contains selected administrative information from the HLR 146. The VLR may contain information necessary for call control and provision of subscribed services for each mobile subscriber currently located in a geographical area controlled by the VLR 147. The HLR 146 and the VLR 147, together with MSC 144, may provide call routing and roaming capabilities of the GSM network. The AuC 148 may provide parameters for authentication and/or encryption functions. Such parameters may allow verification of a subscriber's identity. The EIR 149 may store security-sensitive information about the mobile equipment.

The Short Message Service Center (SMSC) 151 may allow one-to-one Short Message Service (SMS) messages to be sent to/from the mobile subscriber 140. For example, the Push Proxy Gateway (PPG) 152 may be used to "push" (i.e., send without a synchronous request) content to mobile subscriber 119. The PPG 152 may act as a proxy between wired and wireless networks to facilitate pushing of data to MS 140. Short Message Peer to Peer (SMPP) protocol router 153 may be provided to convert SMS-based SMPP messages to cell broadcast messages. SMPP may include a protocol for exchanging SMS messages between SMS peer entities such as short message service centers. It may allow third parties, e.g., content suppliers such as news organizations, to submit bulk messages.

To gain access to GSM services, such as speech, data, and short message service (SMS), the MS 140 may first register with the network to indicate its current location by performing a location update and IMSI attach procedure. MS 140 may send a location update including its current location information to the MSC/VLR, via the BTS 141 and the BSC 142. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 157 may be logically implemented on the GSM core network architecture by introducing two packet-switching network nodes, a serving GPRS support node (SGSN) 155 and a Gateway GPRS support node (GGSN) 156. The SGSN 155 may be at the same hierarchical level as the MSC 144 in the GSM network. The SGSN may control the connection between the GPRS network and the MS 140. The SGSN may also keep track of individual MS locations, security functions, and access controls.

The Cell Broadcast Center (CBC) 171 may communicate cell broadcast messages that are typically delivered to multiple users in a specified area. A Cell Broadcast may include a one-to-many geographically focused service. It may enable messages to be communicated to multiple mobile phone customers who are located within a given part of its network coverage area at the time the message is broadcast.

The GGSN 156 may provide a gateway between the GPRS network and a public packet network (PDN) or other IP networks 158. That is, the GGSN may provide interworking functionality with external networks, and may set up a logical link to the MS through the SGSN. When packet-switched data leaves the GPRS network, it is transferred to external TCP-IP network 158, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time. The class B MS may attach to the network for both GPRS services and GSM services simultaneously. However, the class B MS may not support simultaneous operation of the GPRS services and GSM services. That is, the class B MS may use one of the two services at a given time. A class C MS may attach to one of the GPRS services and GSM services at a time. A class C MS can attach for only one of the GPRS services and GSM services at a time. Simultaneous attachment and operation of GPRS services and GSM services is not possible with a class C MS.

The GPRS network 157 may be designed to operate in three network operation modes (NOM1, NOM2 and NOM3). A network operation mode of a GPRS network may be indicated by a parameter in system information messages transmitted within a cell. The system information messages may dictate to a MS where to listen for paging messages and how signal towards the network. The network operation mode may represent the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS is receiving data and is not listening to a paging channel In a NOM3 network, a MS may monitor pages for a circuit switched network while receiving data and vice versa.

IP multimedia network 159 was introduced with 3GPP Release 5, and includes IP multimedia subsystem (IMS) 160 to provide rich multimedia services to end users. A representative set of the network entities within IMS 160 are a call/session control function (CSCF), media gateway control function (MGCF) 162, media gateway (MGW) 165, and a master subscriber database, referred to as a home subscriber server (HSS) 168. HSS 168 may be common to GSM network 154, GPRS network 157 as well as IP multimedia network 159.

IP multimedia system 160 is built around the call/session control function, of which there are three types: interrogating CSCF (I-CSCF) 164, proxy CSCF (P-CSCF) 161 and serving CSCF (S-CSCF) 163. P-CSCF 161 may be the MS's first point of contact with IMS 160. P-CSCF 161 forwards session initiation protocol (SIP) messages received from the MS to an SIP server in a home network (and vice versa) of the MS. P-CSCF 161 may also modify an outgoing request according to a set of rules defined by the network operator (for example, address analysis and potential modification).

The I-CSCF 164 may be an entrance to a home network, may hide the inner topology of the home network from other networks, and may provide flexibility for selecting an S-CSCF. The I-CSCF 164 may contact subscriber location function (SLF) 169 to determine which HSS 168 to use for the particular subscriber, if multiple HSSs 168 are present. The S-CSCF 163 may perform the session control services for the MS 140. This includes routing originating sessions to external networks and routing terminating sessions to visited networks. S-CSCF 163 may also decide whether application server (AS) 167 is required to receive information on an incoming SIP session request to ensure appropriate service handling. This decision may be based on information received from HSS 168 (or other sources, such as application server 167). The AS 167 also communicates to location server 170 (e.g., a Gateway Mobile Location Center (GMLC)) that provides a position (e.g., latitude/longitude coordinates) of the MS 140.

The HSS 168 may contain a subscriber profile and may keep track of which core network node is currently handling the subscriber. It may also support subscriber authentication and authorization functions (AAA). In networks with more than one HSS 168, a subscriber location function provides information on HSS 168 that contains the profile of a given subscriber.

The MGCF 162 may provide interworking functionality between SIP session control signaling from IMS 160 and ISUP/BICC call control signaling from the external GSTN networks (not shown). It also may control the media gateway (MGW) 165 that provides user-plane interworking functionality (e.g., converting between AMR- and PCM-coded voice). The MGW 165 may communicate with other IP multimedia networks 166.

The Push to Talk over Cellular (PoC) capable mobile phones may register with the wireless network when the phones are in a predefined area (e.g., job site, etc.). When the mobile phones leave the area, they may register with the network in their new location as being outside the predefined area. This registration, however, may not indicate the actual physical location of the mobile phones outside the pre-defined area.

Any of the components described in relation to FIG. 2 may comprise a processor. A processor may include any hardware and/or software necessary for operating and/or controlling the component and/or components. A processor may have its own memory such as random access memory (RAM), register memory, cache memory, and the like. A processor associated with a component may be in communication with one or more of the other components described in relation to FIG. 2.

A processor may operate on computer-executable instructions. Computer-executable instructions may include computer-readable instructions, for example machine code, byte code, script language, runtime code, and the like. The computer-executable instructions, when executed by the processor, may for example cause the processor to perform one or more parts of the functions and methods herein described.

Figure 3:
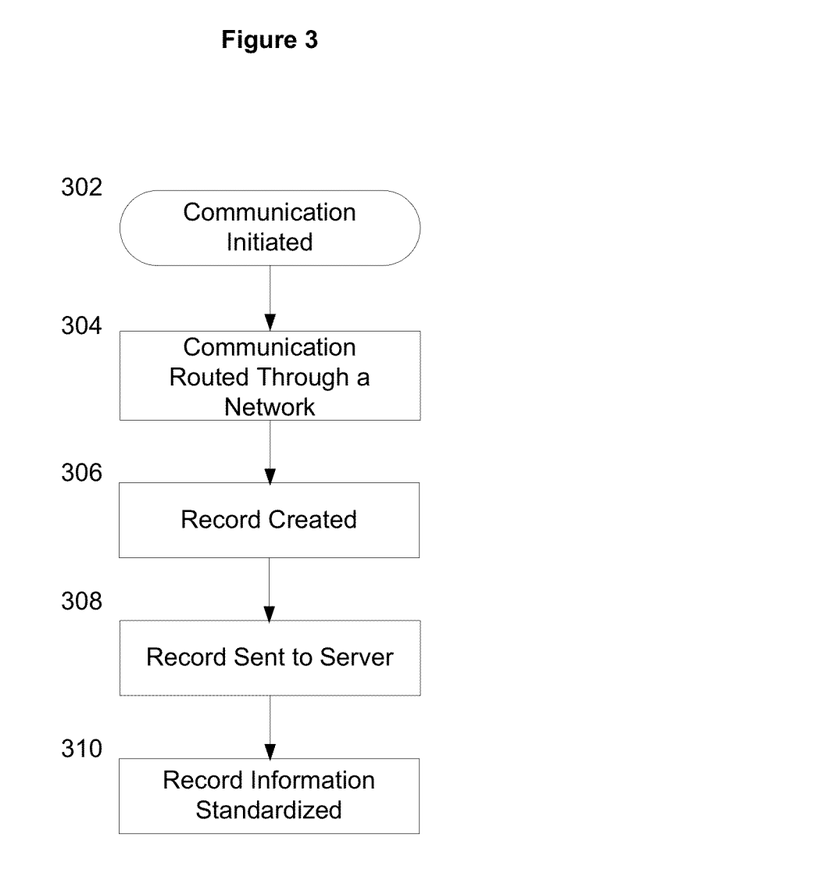
FIG. 3 illustrates an exemplary method of creating data relating to subscribers based on communications routed through a network.

FIG. 3 illustrates an exemplary method of creating a data record relating to a communication routed through a network. At 302, a communication may be initiated. For example, a phone call to/from a mobile subscriber may be initiated.

At 304, the communication may be routed through a network. The communication may be a phone call routed through a network for transmitting phone calls, such as the networks described in relation to FIGS. 1A, 1B and 2. For example, the call may be received/switched at a cell tower and routed through a network; that is, there may be a switch associated with the cell tower that serves to switch the call along to its destination (see FIG. 1B and FIG. 2 for example).

An example of a call routed through a cellular telephone network may be a call placed from one mobile subscriber to another mobile subscriber. Another example may be a call placed to/from a mobile subscriber from/to a land line phone. Still another example may be a call placed to/from a satellite phone from/to a mobile subscriber. That is, a network that switches cellular telephone calls may be involved whenever one of the parties on a call is a mobile subscriber.

Components of the network may create a data record. At 306, a record may be created relating to the communication. The record may contain multitudinous information fields. For example, the communication may be a phone call and the record may be a Call Detail Record (CDR). A CDR may include information such as the phone number placing the call (i.e., the originating phone number), the subscriber associated with the originating number, the phone number receiving the call (i.e., the target phone number), the subscriber associated with the target phone number, the duration of the call, cell tower information, RF interference encountered during the call, etc.

The record may be created and/or recorded by routing components associated with routing the communication (e.g., BTS's 101, 102, 103, 123, 141, BSC's 122, 142, etc.). Using the phone call example, a CDR may be opened when a call connects with a cell tower where the call is passed through a switch. When the call is completed, the CDR may be closed. Further, there may be several different CDR's created for any given call depending on packet types, transferring the call from one tower to another, etc. Further, the CDR may be created for purposes other than determining subscriber metrics (e.g., billing), which may avoid redundant creation of data.

At 308, the record may be sent to a server, e.g., a CDR may be sent to a server (CDR data may be streamed from a cell tower switch to a server). For example, because there may be many switching points in a network, CDR's may be forwarded to a server from many different locations. It should be noted that the routing function may be performed by any equipment capable of performing as herein described.

At 310, records may be standardized. For example, CDR information may be standardized. Standardization may be helpful because the server may receive multiple records that have different attributes, such as different formatting and/or non-standardized information fields. This may be likely to occur where records are sent to the server from different locations and/or types of equipment. For example, different switch manufacturers may have different standards for records.

Figure 4:
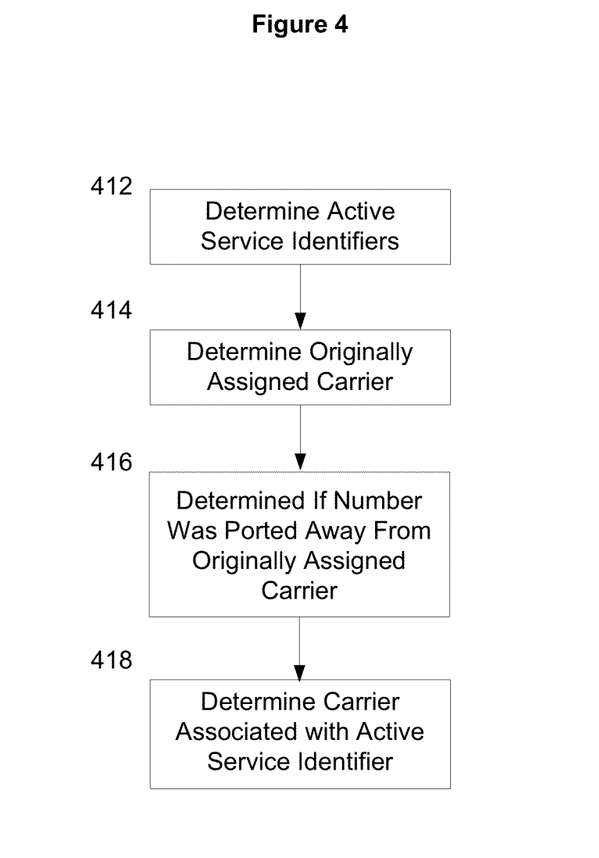
FIG. 4 illustrates an exemplary method to determine subscriber metric information.

FIG. 4 illustrates an exemplary method to determine subscriber metric information based on information in a record. At 412, an active service identifier(s) may be identified (e.g., the record may identify the active service identifier). The active service identifier may relate to a service provided by a carrier. For example, a phone number may be a service identifier associated with phone service provided by a carrier, an internet service user account number may be a service identifier of internet service provided by a carrier, etc. An active service identifier may refer to a service identifier that was used in association with the service for which a record was created. For example, a phone number may be identified as an originating number or a target number in a CDR associated with a switched call; and thus, the phone number may be an active phone number. That is, if a call originated from a mobile subscriber, the number associated with the originating mobile subscriber may be an active number. Likewise, if a call was received by a mobile subscriber, the number associated with the receiving mobile subscriber may be an active number. An active phone number may be an active service identifier.

An active service identifier may be compared to one or more databases to determine which carrier is associated with the active service identifier. In this way a number of active service identifiers associated with a given carrier may be determined At 414-418, an example is illustrated using the phone call example.

At 414, for a phone number identified in a CDR, a determination may be made as to which carrier the number was first assigned. One way to determine the carrier originally assigned to a number is to compare the number with data from the Local Exchange Routing Guide (LERG).

The LERG identifies which carrier was assigned a particular block of numbers. By comparing a number to the LERG, a determination may be made as to which carrier was originally associated with the number.

At 416, a determination may be made as to whether the number was ported from the original carrier to another carrier. One way to determine whether a number was ported away from the originally assigned carrier may be to compare the number with Local Number Portability (LNP) data.

At 418, the carrier associated with the number may be determined Still using the phone call example, if there is no record in the LNP data that a number has been ported, it may be assumed that the number may be associated with the originally assigned carrier. Likewise, if the LNP indicates that the number has been ported to a carrier, it may be assumed that the carrier listed in the LNP (i.e., the ported carrier) is the present carrier associated with the number.

The subscriber metric information gathered as described in FIG. 4 may be repeated for many switched communications identifying many active service identifiers. Further, data may be gathered for a particular period of time. For example, the data may be gathered weekly, bi-monthly, monthly, etc. The time periods used for gathering and organizing the information is a matter of design choice.

Using the systems and methods herein disclosed may provide distinct advantages over the prior art. By using active service identifiers, the disclosed systems and methods may eliminate researching unassigned or inaccurately labeled service identifiers. Referring back to the example of the phone call, because the prior art uses blocks of assigned numbers that may or may not be active and may or may not be correctly assigned, resources are wasted. Because the methods herein described do not research active service identifiers that may be inactive or incorrectly assigned, the present methods may be more efficient than the prior art.

Another advantage is that the error introduced by statistical analysis is reduced. Because data may be gathered for a high percentage of active service identifiers, the error introduced by estimating subscriber metrics from only a small amount of data may be reduced.

Another advantage is that it is easier for a carrier to perform its own analysis and may avoid using a third party that does not have in-depth knowledge of the carrier's marketing goals and may have conflicts of interest with the carrier (e.g., conflicts arising from providing subscriber metrics to multiple carriers).

Referring back to 304 in FIG. 3, and using the phone call example, CDR information is created for calls that interact with a network. There is a multiplication effect for carriers that route calls. That is, a carrier can access information not only for subscribers associated with the carrier, but also from other subscribers associated with other carriers. For example, consider a call from one mobile subscriber associated with a first carrier to another mobile subscriber associated with a second carrier. The call may be routed at some point by the first carrier to the second carrier. Further, the first carrier may have access to information about both subscribers from the CDR. Thus, the first carrier may receive information for more than just its own subscribers. Due to the multiplication effect, large carriers may be able to access information for a large majority of active subscribers.

Another advantage is that SS7 queries are not necessary. The data on active service identifiers is generated as communications are routed. Thus, separate SS7 queries are not needed. Thus, less computing resources may be needed. In addition, a carrier may not add additional load to networks by making SS7 queries.

Figure 5:
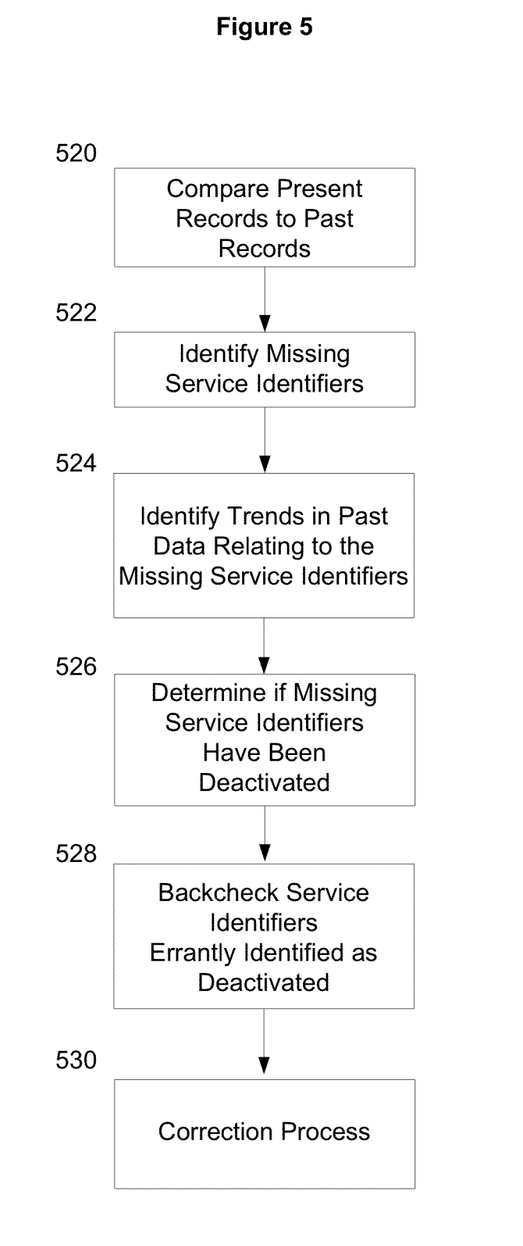
FIG. 5 illustrates an exemplary method to determine deactivations.

Additional features may be added to the methods described in relation to FIG. 4 in order to track additional subscriber information. For example, FIG. 5 illustrates an exemplary method to determine deactivations.

At 520, present records may be compared to past records, e.g., present CDR data may be compared to past CDR data. For example, a phone number may have been an active phone number in previous data sets as indicated by past CDR's. However, the phone number may not appear in the current data set.

At 522, service identifiers may be identified that were in previous data sets, but not in current data sets, e.g., phone numbers may be identified that were in previous data sets, but not in current data sets (i.e., missing numbers). For example, CDR data sets may be available for the first four weeks of a year. A number may have been present in one or more of weeks one through three. However, the number may not be present in the CDR data set for week four.

At 524, trends may be identified in past data for service identifiers. The identified trends may aid in assessing deactivations. At 526, a determination may be made as to whether the identified service identifiers have been deactivated. Statistical analysis, algorithms and/or set thresholds may be used to determine if an identified service identifiers has been deactivated.

Consider the following examples relating to phone calls. For numbers showing no activity for two weeks, the number may be considered deactivated if the number was used to make and/or receive an average of 20 calls per week for the three months prior to inactive period. Another rule may be used for numbers that may have been inactive for four weeks, but may not have been classified as deactivated by the two week data. For example, for numbers showing no activity for four weeks, the number may be considered deactivated if the number was used to make and/or receive an average of 10 calls per month for the three months prior to inactive period. Another rule may be used for numbers that may have been inactive for twelve weeks, but may not have been classified as deactivated by the two or four week data. For example, for numbers showing no activity for twelve weeks, the number may be considered deactivated if the number was used to make and/or receive an average of 10 calls per quarter for the three months prior to inactive period.

The foregoing examples are matters of design choice. Irrespective of the design choice, a carrier may set rules to determine deactivations from trends in records, such as CDR data.

At 528, a backcheck of service identifiers errantly identified as deactivated may be performed. Using the phone call example, a number may have been identified as deactivated (e.g., a number may have satisfied one of the above examples). However, the number previously identified as deactivated may be listed in the present data set as an active number, still associated with the same subscriber and the same carrier as the last time it was active (e.g. calling patterns are the same). Thus, the number may have been errantly identified as deactivated.

Time limits may be placed on the amount of time that passes for a service identifier to still be considered errantly identified as deactivated. For example, if a year passed with no activity from the service identifier, the service identifier may not be considered errantly identified as deactivated.

At 530, a correction process may be performed. The correction process may base a correction on such things as trends in record data or service identifiers errantly identified as deactivated at 528. Using the phone call example, trends in CDR data may reveal that a certain month may have many more numbers without activity than other months, increasing the chance of errantly identifying numbers as deactivated. Adjustments may be performed to make an allowance for such a trend. A correction process may be performed to adjust the determination at 526 to be less stringent (i.e., require a passage of more time before a service identifier is identified as deactivated).

Another example may be a phone number that has only sporadic activity with lengthy periods of inactivity between uses. Such a mobile subscriber may be a "glovebox user," that is, a mobile subscriber that may keep a phone for emergencies or specific functions and does not use the number in a consistent way. If a number is identified as being used only in such a sporadic manner, a correction process may be performed to adjust the determination at 526 to be less stringent or to remove the number from consideration as a deactivated number.

The foregoing examples are matters of design choice. Irrespective of the design choice, records may be used to identify trends to make corrections to the process.

Figure 6:
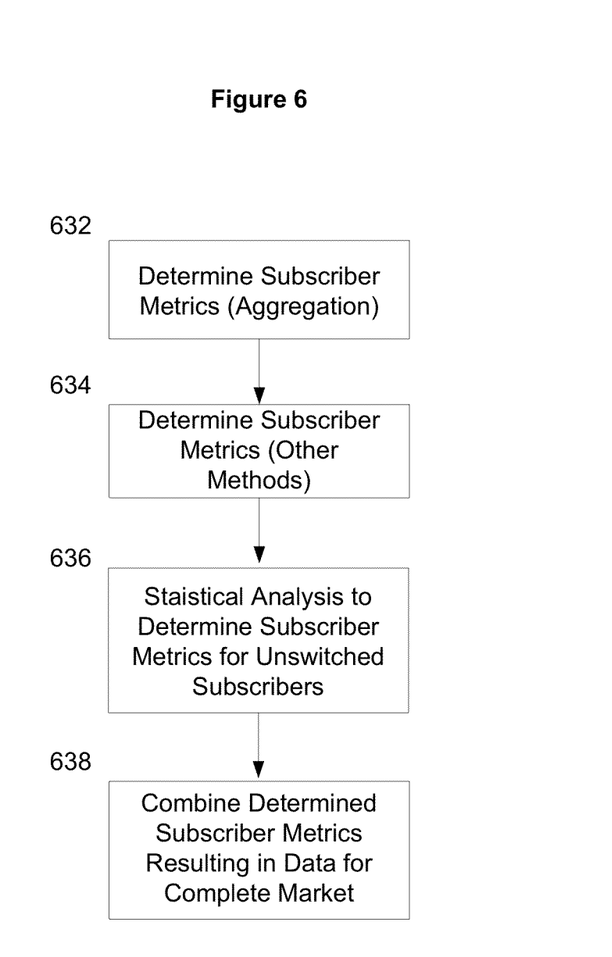
FIG. 6 illustrates methods to determine subscriber metrics.

FIG. 6 illustrates methods to determine subscriber metrics by aggregating data. At 632, subscriber metrics may be determined for active service identifiers. Referring back to FIG. 4, at 412-418 subscriber metric information is determined (e.g., a carrier associated with an active service identifier is identified).

At 632, carrier determinations may be aggregated to provide a number of service identifiers/subscribers associated with a given carrier. For example, the determination made in FIG. 4 (e.g., at 418) may be repeated for a large amount of communications. The large amount of communications may identify a large amount of active service identifiers. As illustrated in FIG. 4, a carrier associated with each of the active service identifiers may be identified. Further, each of the active service identifiers associated with a first carrier may be aggregated. That is, by adding together each subscriber associated with the first carrier, a number of subscribers associated with the first carrier may be determined. Likewise, each of the active service identifiers associated with a second carrier may be aggregated resulting in a number of subscribers associated with the second carrier. This process may be repeated for other carriers. The carrier subscriber data may be used to determine other subscriber metrics.

The carrier subscriber data may also be used to determine a market share for a carrier. For example, a market share for the first carrier may be determined by calculating the ratio of the number of subscribers associated with the first carrier in a market to a total number of subscribers in the market.

At 634, subscriber metrics may be determined based upon analysis of present record data compared to past record data. For example, FIG. 5 illustrates determining a deactivation based on such data. By aggregating such data, subscriber metrics may be created for absolute numbers of deactivations per carrier, percentage of deactivations per carrier, etc.

At 636, statistical analysis and/or extrapolation of the subscriber metrics determined at 632 and/or 634 may be used to calculate subscriber metrics for the rest of a market (e.g., national market, regional market, local market, micromarket, etc.). At 632 and/or 634, subscriber metrics may have been calculated for a market. However, the subscriber metrics calculated at 632 and/or 634 may provide data for active service identifiers that were identified by switched communications. There may be other active service identifiers in the market that were not switched. That is, the subscriber metrics calculated at 632 and/or 634 may represent less than all of the active service identifiers/subscribers in a given market.

Statistical analysis may be performed on the data collected in order to estimate subscriber metrics for the part of the market not identified in communications switched by the network. The statistical analysis may be as simple as extrapolating from the numbers calculated at 632 and/or 634 to using detailed algorithms. As an example of the statistical analysis that may be employed, algorithms may be used to estimate activity levels of non-measured subscribers. Results may be reconciled against historical patterns or national reported carrier data for example, thus, subscriber metrics for a market can be provided. The methods used to estimate subscriber metrics for the remaining active service identifiers (i.e., active service identifiers that were not routed through the network) is a matter of design choice. Irrespective of design choice, the data at 632 and/or 634 may be processed to estimate data for active service identifiers that were not switched by a carrier's network.

At 638, the subscriber metrics determined at 632, 634 and/or 636 may be combined to provide subscriber metrics. For example, at 632 the number of subscribers per carrier may be calculated for switched communications in a market (e.g., communications that were switched by a carrier's network). At 636, the number of subscribers per carrier may be calculated for active service identifiers that were not identified by switched communications in a market. The data at 632 and 636 may be combined to provide the total number of subscribers per carrier in a market. Further, a market share for a given carrier may be calculated (e.g., a market share for a first carrier may be determined by calculating the ratio of the number of subscribers associated with the first carrier in a market to a total number of subscribers in the market).

Reference is made herein to the methods being performed by a carrier with a network. However, the systems and methods disclosed herein are not limited to implementation by a single carrier with a single network. For example, multiple carriers may share data. Further, a single carrier may have access to more than its own network.

Reference is made herein to records generated and used in order to provide subscriber metrics. The creation of subscriber metrics as herein described may be for particular periods of time. For example, records may be created during a two week period. Further, subscriber metrics may be created from the records, thus, providing subscriber metrics for that two week period. The time periods used for gathering and organizing the information is a matter of design choice.

What is claimed is:

1. A method comprising:
   receiving a plurality of records, each of which is associated with a switching point in a network in response to a request for a routed service associated with a source telephone number identified in the record, wherein each record comprises a recipient telephone number;
   determining an associated service provider for each recipient telephone number by comparing each recipient telephone number to:
      information indicating that a respective telephone number is assigned to a respective service provider, and
      information associated with local number portability; and
   determining a number of recipient telephone numbers for a first service provider by aggregating each recipient telephone number associated with the first carrier.

2. The method of claim 1, further comprising determining a market share of active telephone numbers for the first service provider.

3. The method of claim 2, wherein the market share of active telephone numbers for the first service provider is determined by calculating a ratio of the number of recipient telephone numbers to a total number of recipient telephone numbers identified in the plurality of records.

4. The method of claim 1, wherein each source telephone numbers is an active phone number.

5. The method of claim 1, wherein the plurality of records is collected from a network controlled by one entity.

6. The method of claim 1, wherein the plurality of records is a plurality of call detail records.

7. The method of claim 1, wherein each recipient telephone numbers is an active phone number.

8. A system comprising:
   at least one memory comprising instructions; and at least one computer processor in communication with the at least one memory, wherein the at least one computer processor, when executing the instructions, effectuates operations comprising:
- receiving a plurality of records, each of which is associated with a switching point in a network in response to a request for a routed service associated with a source telephone number identified in the record, wherein each record comprises a recipient telephone number;
- determining an associated service provider for each recipient telephone number by comparing each recipient telephone number to:
  - information indicating that a respective telephone number is assigned to a respective service provider, and
  - information associated with local number portability; and
- determining a number of recipient telephone numbers for a first service provider by aggregating each recipient telephone number associated with the first carrier.

9. The system of claim 8, wherein the operations further comprise determining a market share of active telephone numbers for the first service provider.

10. The system of claim 9, wherein the market share of active telephone numbers for the first service provider is determined by calculating a ratio of the number of recipient telephone numbers to a total number of recipient telephone numbers identified in the plurality of records.

11. The system of claim 8, wherein each source telephone numbers is an active phone number.

12. The system of claim 8, wherein the plurality of records is collected from a network controlled by one entity.

13. The system of claim 8, wherein the plurality of records is a plurality of call detail records.

14. The system of claim 1, wherein each recipient telephone numbers is an active phone number.

15. A computer-readable medium that is not a transient signal, the computer-readable medium comprising computer-executable instructions to:
- receive a plurality of records, each of which is associated with a switching point in a network in response to a request for a routed service associated with a source telephone number identified in the record, wherein each record comprises a recipient telephone number;
- determine an associated service provider for each recipient telephone number by comparing each recipient telephone number to:
  - information indicating that a respective telephone number is assigned to a respective service provider, and
  - information associated with local number portability; and
- determine a number of recipient telephone numbers for a first service provider by aggregating each recipient telephone number associated with the first carrier.

16. The computer-readable medium of claim 15, wherein the computer-readable medium further comprises computer-executable instructions to determine a market share of active telephone numbers for the first service provider.

17. The computer-readable medium of claim 16, wherein the market share of active telephone numbers for the first service provider is determined by calculating a ratio of the number of recipient telephone numbers to a total number of recipient telephone numbers identified in the plurality of records.

18. The computer-readable medium of claim 15, wherein each source telephone numbers is an active phone number.

19. The computer-readable medium of claim 15, wherein the plurality of records is collected from a network controlled by one entity.

20. The computer-readable medium of claim 15, wherein the plurality of records is a plurality of call detail records.

* * * * *